United States Patent
Chan et al.

(10) Patent No.: US 9,740,540 B2
(45) Date of Patent: Aug. 22, 2017

(54) METHOD OF PROCESS CONTEXT-AWARENESS

(71) Applicant: NATIONAL CHUNG SHAN INSTITUTE OF SCIENCE AND TECHNOLOGY, Taoyuan (TW)

(72) Inventors: Tzu-Ming Chan, Taoyuan (TW); Wen-Hao Hsiao, Taoyuan (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 0 days.

(21) Appl. No.: 14/945,550

(22) Filed: Nov. 19, 2015

(65) Prior Publication Data
US 2016/0188388 A1  Jun. 30, 2016

(30) Foreign Application Priority Data
Dec. 30, 2014 (TW) .............................. 103146170 A

(51) Int. Cl.
*G06F 9/54* (2006.01)
*G06Q 10/06* (2012.01)
*G06N 5/02* (2006.01)

(52) U.S. Cl.
CPC ............ *G06F 9/542* (2013.01); *G06N 5/025* (2013.01); *G06Q 10/06* (2013.01)

(58) Field of Classification Search
None
See application file for complete search history.

(56) References Cited

U.S. PATENT DOCUMENTS

2013/0325559 A1* 12/2013 Daley ................. G06Q 10/067
705/7.36

* cited by examiner

*Primary Examiner* — Syed Roni
(74) *Attorney, Agent, or Firm* — Schmeiser, Olsen & Watts, LLP

(57) ABSTRACT

A process context-awareness method analyzes events arising from a process according to context concepts, compare and analyze entity contents of the events, event types, applicable contextual situations and rules, so as to subsequently trigger the other activities or yield result. The method applies to enterprise information systems, project scheme execution or meets any other operation requirement, suits different enterprise operational context, gains insight into dynamic circumstances of the enterprise context.

6 Claims, 1 Drawing Sheet

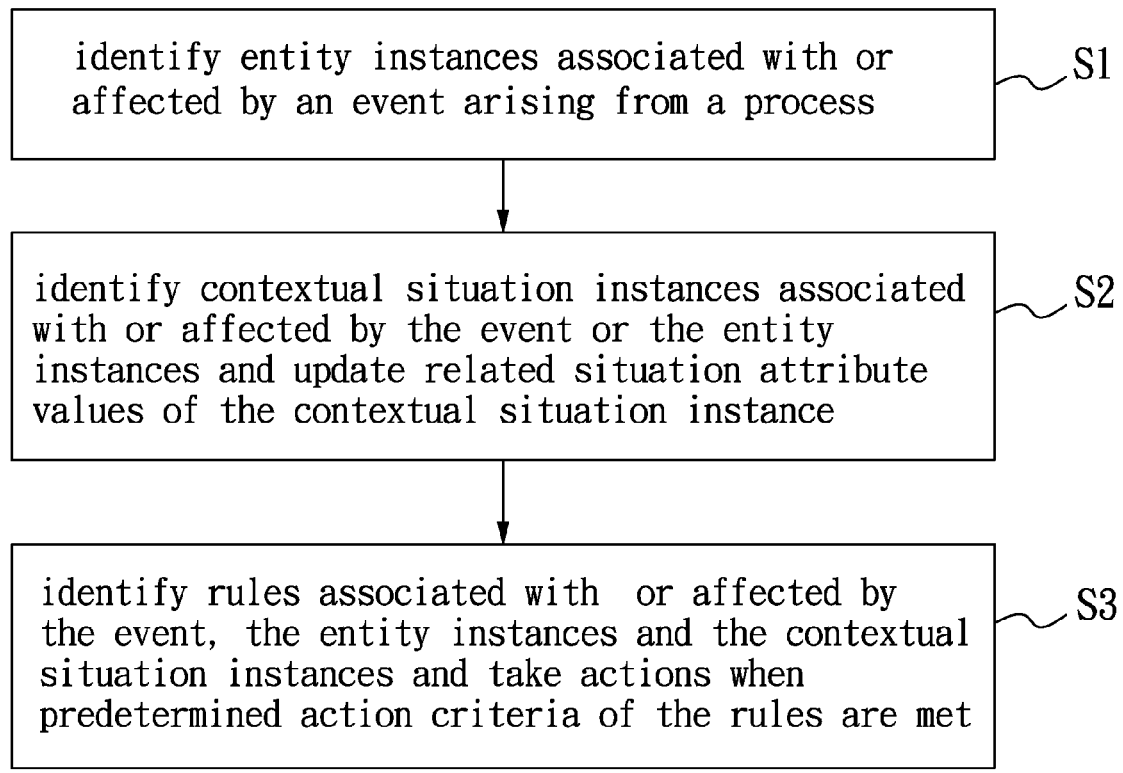

METHOD OF PROCESS CONTEXT-AWARENESS

CROSS-REFERENCE TO RELATED APPLICATION

This non-provisional application claims priority under 35 U.S.C. §119(a) on Patent Application No(s). 103146170 filed in Taiwan, R.O.C. on Dec. 30, 2014, the entire contents of which are hereby incorporated by reference.

FIELD OF TECHNOLOGY

The present invention relates to process processing method and more particularly to a process context-awareness method for analyzing the context and relevant attributes of an event arising from a process.

BACKGROUND

Enterprise-specific information processing processes, such as project management, system engineering management, and product management, have a certain logic. No single system can be applied to all types of enterprises invariably, because organizational structure, environment and management vary from enterprise to enterprise. Hence, there are two disadvantages for a professional information system which is customized according to a single tenant requirement. First, the custom-made professional information system incurs a high cost. Second, not only does switching the professional information system between enterprises which differ from each other in attributes inevitably require adjusting their organizational structure and work requirements, but the complexities and difficulties in creating and maintaining the professional information system also increase with cases, as the version of a program for use in executing the professional information system varies from enterprise to enterprise.

Those enterprises with a stable work process tend to carry out information process management with a workflow management system which allows the enterprises to predefine a process and then handle the process during the run-time according to the predefined logic. Under the workflow management system, the appointment of personnel is dynamical enough to cope with any special situation; however, the workflow management system cannot be adjusted according to an organizational situation and thus is inflexible in application.

Furthermore, information for defining the situation of an object is known as its context. The object can be a person, space or information about the correlation between a user and an object being used by the user. Context also means the information about the surroundings and dynamic scenario of an object, such as the information pertaining to time, a place and a group. Context analysis involves giving considerations to whatever environmental parameters and criteria which may affect the object, for example, valuing a building by its age, and judging the features of an artist's works with reference to the artist's nationality and place of birth. Taking enterprise operational context as an example, an enterprise carries out a process in a specific environment, finishes its work and produces related information, and thus the parameters required for the enterprise context include organization, environment, process, and information. In this regard, organization, process, and information not only vary from enterprise to enterprise in breadth and depth, but also vary from project to project undertaken by the same enterprise. Context analysis entails giving considerations to plenty of criteria and thus is effective in doing a job, evaluating a situation, and observing a result comprehensively and precisely. To develop an information system for use in a professional field, it is necessary for the information system to be flexible enough to suit various enterprise operational context when operating but still retain a certain degree of professionalism, with its uncompromised parts built in the system information's entity architecture and process units. The ways the enterprises operate are defined by a configuration procedure, and data produced as a result of the operational process must be distinguished, stored and isolated easily. It is only when the aforesaid objectives are achieved that the requirements of enterprise process architecture are met.

As regards the aforesaid context definitions, any descriptive information of a situation for an individual is known as the context of the individual. The individual is occupied by a person, a place, an organization, a document, a project, and any object pertaining to the interactive relation between a person and a system, including the person and the applicable system. Context-awareness refers to the phenomenon where a system provides dynamic information related to a user's work according to a context concept or constructs an operational process according to a context concept to serve the user; as such, the system is regarded as capable of context-awareness.

SUMMARY

In view of the aforesaid drawbacks of the prior art, the present invention provides a process context-awareness method which uses a context concept to define the entity structures, such as business-related information entities and process-related entities, required for process processing. When the run-time of a start process activity begins, an entity instance is dynamically created according to the definitions of entity structure fields and business requirements. The fields of the instances record the data pertaining to the process in operation. An event occurs whenever an entity instance is created, deleted or updated with regard to its field data. Through analyzing the events arising from the process activities, it is feasible to compare and analyze the entity instance contents of the events, event types, applicable contextual situations and rules, so as to subsequently trigger the other activities and create the other entity instances. The present invention can be applied to workflow based enterprise information systems, project scheme execution or meets any other operation requirement, suits different enterprise operational context, and gains insight into dynamic circumstances of the enterprise context to thereby identify flexible solutions thereto. Hence, process information systems created with the method save manpower, time and costs otherwise incurred in constructing customized systems for use by different tenants and enhance the system maintainability.

The present invention provides a process context-awareness method, adapted to analyze an event arising from a process with concept of context-awareness, the method comprising the steps of: identifying entity instances associated with or affected by an event arising from a process; identifying contextual situation instances associated with or affected by the event or the entity instances and updating related situation attribute values of the contextual situation instances; and identifying rules associated with or affected by the event, the entity instances and the contextual situation instances and taking actions when predetermined action criteria of the rules are met.

Regarding the process context-awareness method of the present invention, its operation is preceded by the steps of creating and defining a context model, wherein the context model comprises a structural definition of the entity instance, a structural definition of the contextual situation instance, and definitions of the action criteria of the rule.

Both the overview above and the description below aim to further explain the measures taken to achieve the predetermined objectives, means and advantages of the present invention. The other objectives and advantages of the present invention are further described by the description below and the accompanying drawings.

BRIEF DESCRIPTION

Objectives, features, and advantages of the present invention are hereunder illustrated with specific embodiments in conjunction with the accompanying drawing, in which:

FIG. 1 is a schematic view of the process flow of a process context-awareness method according to the present invention

DETAILED DESCRIPTION

To render the features and advantages of the present invention more obvious and comprehensible, the present invention is hereunder illustrated with specific embodiments.

FIG. 1 is a schematic view of the process flow of a process context-awareness method according to the present invention. As shown in the diagram, the process context-awareness method aims to analyze an event which occurs during a process by the concept of context-awareness and comprises: step S1: identifying entity instances associated with or affected by an event arising from a process; step S2: identifying contextual situation instances associated with or affected by the event or the entity instances and updating related situation attribute values of the contextual situation instances; step S3: identifying rules associated with or affected by the event, the entity instances and the contextual situation instances and taking actions when predetermined action criteria of the rules are met.

The present invention provides a process context-awareness method. The method is for use with a process operation architecture created according to a context concept. The process operation architecture requires creating a context model, performing context defining and context modeling, including defining the contents and structures of various entities or entity instances, defining the contents and structures of various contextual situations or contextual situation instances, and defining the contents of various rules. Defining the contents and structures of the contextual situations include defining the parameters of the scope of application of the contextual situations and defining the attributes manifested by the contextual situations and relevant entity instance information. After defining the context model, it is necessary to identify, create or update specific entity instances and contextual situation instances according to events arising from the process or extrinsic events during the run-time of the process, so as to take an action according to a predetermined rule during the run-time of the process. According to the present invention, the defined process comprises one or more activities. The process starts as soon as an admission criterion is met and ends as soon as a discharge criterion is met. Each activity is carried out as soon as a trigger criterion is met and ends as soon as a complete criterion is met.

According to the present invention, the defined context is information pertaining to the dynamic scenario or environment in which the process operates. The contextual situations aim to record or describe the current condition, contents, applicable objects, scope, operation modes, and timing of the context, come in the form of a plurality of formulas, or are distinguished by a means of selection. The contextual situation instances are created according to the definitions of the context model whenever the time to create contextual situation instances comes during the run-time of the process and require specifying or defining the scope and values of the contextual situation instances. The contextual situation instances are either created according to the events and the entity instances or have their contents, attributes and values thereof changed according to the events and the entity instances. In practice, the entity instances describe the entity information about a person, matter, object or point in time which exists or has ever existed. The contextual situation instances describe or record the formulas, selection criteria, combinations or any other interactive relations for use in analyzing the aforesaid entity information according to a context concept.

In practice, the context scope applicable to the present invention comprises organizational structure, operational process steps, personnel job assignment, data flow processing. Before the process is carried out, situations corresponding to a specific entity data model are defined. A collection of the definitions is contained in the context model and known as a contextual situation model. During the run-time of the process, the information system constructs the constituent units (i.e., activities) of the process according to the context model as well as starts the process and assigns jobs to role personnel of the operation according to a predetermined criterion and a rule. During the operation, the data of each relevant information entity is continuously and dynamically updated while the contextual situation instances are being fed back and updated. The operation-related rules of the process are applied in order to dynamically adjust the process or start another process according to relevant contextual situation instances. In the course of the operation of the process, if the process and its one or more activities are triggered by specific criteria to thereby bring about an event, the process context-awareness method of the present invention will compare and analyze the contents of the entities or entity instances of the event, applicable contextual situation instances, and rules, such that subsequently the process will trigger the other activities, affect instances or yield results.

According to the present invention, the defined instances refer to various information generated during the run-time of the process and according to definitions included in the contextual situation or triggered by a specific event or a specific entity. The entities refer to various information structure individuals during the process, namely persons, matters, and objects which participate in the process or arise from the process. Taking enterprise operation as an example, relevant entities of enterprise operational context comprise: common entity which includes a timer, a calendar, and an enterprise architecture; organization entity which includes departments, personnel, and roles; process entity which includes a process, an activity, and decision point; and business entity which includes a product, a function, a requirement, a document, a project, work breakdown structures (WBS), a task, a work item, and long-term and short-term milestones. When an event occurs during the process, analyzing the entity structure of the event is equivalent to analyzing which person, matter and object to be affected by the event, wherein the interactive conditions of various entities during the operation of the process, operation rules, correlations and degrees of influence are built in the context model; hence, the present invention involves defining and categorizing the events which occur in a process by context-awareness. The entity instances are about information entities created dynamically during the operation of the process, and their attribute values are updated during the run-time of the process at any time. For example, from the perspective of an enterprise operational process, depending on its customers and the dates of launching a procurement initiative, a product has its processing result varying from operation to operation, because the operations are undertaken by different persons with different customization requirements. Hence, it is necessary to create entity instances and fill out blank fields in any enterprise context model applicable to the procurement or its related contextual situations, but should not apply the same type of information, otherwise confusion may occur. According to the present invention, the defined entity instances are of two types: business entity instances and process entity instances. An event occurs whenever a business entity instance is created, deleted or updated with regard to its attribute values. An event occurs whenever a process entity instance is started, finished, suspended or updated with regard to its attribute values.

According to the present invention, the defined context refers to the information pertaining to the environment or dynamic scenario in which the process operates. The contextual situation is for use in recording or describing the current condition, contents, applicable objects, scope, way of operation, and timing of operation of the context, wherein the contents are expressed by a plurality of attribute values each provided as a result of selecting, combining or calculating the data shown in the fields of one or more entity instances. The contextual situation instances are dynamic created according to the definitions of the contextual situations during the run-time of the process as soon as the requirement of the timing of creating a contextual situation instance as defined in the contextual situations is met, wherein the scope and values thereof of the contextual situation instances are specified and defined. The content attribute values of the contextual situation instances are created according to the events and entity instances and vary with the events and entity instances. In practice, the entity instances are about the entity information for use in describing a person, matter, object, and a point in time which exists or has ever existed. The contextual situation instance describes or records the results of combination, computation, selection criterion, or any other interactive relations of specific entity information analyzed by context concepts.

After analyzing the entity instances of the event, the process context-awareness method of the present invention further involves identifying the contextual situation instances affected by the event and updating the attribute values of the contextual situation instances. The attributes/fields of the contextual situation instances include: contextual situation ID, contextual situation name, contextual situation new instance timing, contextual situation scope, relevant entity name (k), entity formula (i), situation attribute (i), situation attribute value (i), contextual situation instance ID, and contextual situation instance scope and values. The situation attribute value of the contextual situation instance merely indicates the situations of scope, including the situation attribute values (i), contextual situation instance ID, and contextual situation instance scope and values, wherein the contents of the contextual situation instances vary from one instance scope to another, such as for different projects. Entity called in this present invention refers to the entity information which the contextual situations depend on, including entity information or entity instances pertaining to personnel, articles, progress of cases, and points in time. The entity information which a contextual situation instance depends is provided in the plural, wherein k denotes the sequence of the arrangement of the multiple relevant entities and equals 1, 2, 3, . . . by analogy. The way in which each entity instance affects the contextual situation instance or the way in which the contextual situation instance selects a relevant entity instance is explained by formula or embodied in a selection criterion of contextual situation instance. Each context model contains the formula or interact relation record of a plurality of entity instances or contextual situation instances. The situation attribute (i) and the situation attribute values (i) refer to the situation and operational information of the contextual situation instance and vary with information contained in the input event, wherein i denotes the sequence of arrangement of attributes and equals 1, 2, 3, . . . by analogy.

After comparing and updating the entity instances and the contextual situation instances, the process context-awareness method of the present invention further involves comparing a rule and a trigger action. The rule refers to the requirement that an action must be taken during the run-time of the process if a criterion of an event is met, that is, if the event, entity instances associated with or affected by the event, and contextual situation instances associated with or affected by the event meet the action criterion under the rule, actions must be taken. The contents of the rule include: rule ID, rule name, relevant contextual situation name (k), relevant entity name (v), satisfied condition (i), and action. The contextual situations corresponding to the rule are provided in the plural, wherein k denotes the sequence of the arrangement of the multiple contextual situations and equals 1, 2, 3, . . . by analogy. The criteria of the rules are either defined by a user as needed or set to a situation attribute of a specific contextual situation in order to suit various configurations of a context model. The actions to be taken when the criteria of the rules are met include: create entity instances; update entity instance attributes; create contextual situation instances; update contextual situation instance attributes; triggering, including creating matters to be handled, activating work items, starting/suspending specific activities, and choosing specific activities, and, in practice, involving the following: sending back (or uploading) or update information pertaining to a specific person, matter, object, scheme, and activity, for example, reporting to a supervisor, presenting a result report, creating a matter to be handle, starting a work item, choosing a new activity, etc.

The process context-awareness method of the present invention further comprises a registration step which involves registering an event as soon as it occurs. The registration operation entails assigning to the event a specific code (ID), a timestamp (or mark), an event type, an entity item name of the event, an entity instance ID, and updated attributes and values thereof of the entity instance. Since information attributed to the event is not necessarily valid (for example, it may be null or meaningless), the registration step further comprises selecting any item which might affect the contextual situations with a view to speeding up subsequent operation.

The process context-awareness method of the present invention is characterized in that: in practice, when there are multiple events to be processed, the events must be registered first; all those events which occur during the process but have not yet been processed are put in an event queue, such that the events are taken out of the event queue sequentially in order to be registered, and then the events are recorded in an event record storage region. Upon completion of the aforesaid steps, the process flow of the process context-awareness method of the present invention goes back to the event registration step so that the next event is taken out of the event queue and processed. It is only when all the events are taken out of the event queue that the process flow of the process context-awareness method of the present invention stops. All the data thus produced during the process flow of the process context-awareness method of the present invention is stored in a database.

The process context-awareness method of the present invention is applicable to an enterprise management system, system engineering management, project WBS execution, product development information or customer service information system. The present invention also applies to a cloud-based service architecture of a professional information system, supports a multi-tenant application system, suits various enterprise operational context, save the manpower, time and costs otherwise incurred in constructing customized systems for use by different tenants, and enhance the system maintainability.

Although the present invention is disclosed above by embodiments, the embodiments are not restrictive of the present invention. Any persons skilled in the art can make some changes and modifications to the embodiments without departing from the spirit and scope of the present invention. Accordingly, the legal protection for the present invention should be defined by the appended claims.

What is claimed is:

1. A process context-awareness method, adapted to analyze an event arising from a process with concept of context-awareness, the method comprising the steps of:
    identifying entity instances associated with or affected by an event arising from a process;
    identifying contextual situation instances associated with or affected by the event or the entity instances and updating related situation attribute values of the contextual situation instance; and
    identifying rules associated with or affected by the event, the entity instances and the contextual situation instances and taking actions when predetermined action criteria of the rules are met,
    wherein the entity instances are information entity dynamically created during operation of the process, and attribute values of the entity instances are updated at any time during run-time of the process.

2. The process context-awareness method of claim 1, further comprising the step of creating and defining a context model, wherein the context model comprises structural definitions of the entity instances, structural definitions of the contextual situation instances, and definitions of the action criteria of the rules.

3. A process context-awareness method, adapted to analyze an event arising from a process with concept of context-awareness, the method comprising the steps of:
    identifying entity instances associated with or affected by an event arising from a process;
    identifying contextual situation instances associated with or affected by the event or the entity instances and updating related situation attribute values of the contextual situation instance; and
    identifying rules associated with or affected by the event, the entity instances and the contextual situation instances and taking actions when predetermined action criteria of the rules are met,
    wherein the contextual situation instances involve creating the contextual situation instances according to a definition of a context model during run-time of the process and specifying or defining a scope and values of the contextual situation instances.

4. The process context-awareness method of claim 3, further comprising the step of creating and defining a context model, wherein the context model comprises structural definitions of the entity instances, structural definitions of the contextual situation instances, and definitions of the action criteria of the rules.

5. A process context-awareness method, adapted to analyze an event arising from a process with concept of context-awareness, the method comprising the steps of:
    identifying entity instances associated with or affected by an event arising from a process;
    identifying contextual situation instances associated with or affected by the event or the entity instances and updating related situation attribute values of the contextual situation instance; and
    identifying rules associated with or affected by the event, the entity instances and the contextual situation instances and taking actions when predetermined action criteria of the rules are met,
    wherein actions of the rules comprise: creating the entity instances; updating attribute values of the entity instances; creating the contextual situation instances; updating attribute values of the contextual situation instances; triggering, including creating a matter to be handled, activating a work item, starting/suspending a specific activity, and choosing a specific activity.

6. The process context-awareness method of claim 5, further comprising the step of creating and defining a context model, wherein the context model comprises structural definitions of the entity instances, structural definitions of the contextual situation instances, and definitions of the action criteria of the rules.

* * * * *